US009647572B2

(12) United States Patent
Robertson et al.

(10) Patent No.: US 9,647,572 B2
(45) Date of Patent: May 9, 2017

(54) METHOD FOR CONTROLLING A CONVERTER

(71) Applicant: PowerbyProxi Limited, Freemans Bay, Auckland (NZ)

(72) Inventors: Daniel James Robertson, Auckland (NZ); Saining Ren, Auckland (NZ); Eugenio Sia Lecias, Jr., Auckland (NZ)

(73) Assignee: PowerbyProxi Limited, Freemans Bay, Auckland (NZ)

( * ) Notice: Subject to any disclaimer, the term of this patent is extended or adjusted under 35 U.S.C. 154(b) by 0 days.

(21) Appl. No.: 14/357,361

(22) PCT Filed: Nov. 9, 2012

(86) PCT No.: PCT/NZ2012/000209
§ 371 (c)(1),
(2) Date: May 9, 2014

(87) PCT Pub. No.: WO2013/070094
PCT Pub. Date: May 16, 2013

(65) Prior Publication Data
US 2014/0293670 A1    Oct. 2, 2014

Related U.S. Application Data

(60) Provisional application No. 61/637,865, filed on Apr. 25, 2012.

(30) Foreign Application Priority Data

Nov. 10, 2011 (NZ) ........................................ 596350

(51) Int. Cl.
*H02M 3/335*   (2006.01)
*H02M 7/537*   (2006.01)
(Continued)

(52) U.S. Cl.
CPC ............ *H02M 7/537* (2013.01); *H02M 7/48* (2013.01); *H02J 17/00* (2013.01); *H02M 2007/4815* (2013.01); *Y02B 70/1441* (2013.01)

(58) Field of Classification Search
CPC .. H02M 3/28; H02M 3/33569; H02M 3/3376; H02M 3/3384; H02M 3/3388;
(Continued)

(56) References Cited

U.S. PATENT DOCUMENTS

| 3,898,549 A | 8/1975 | Mitchell |
| 4,729,088 A | 3/1988 | Wong |

(Continued)

FOREIGN PATENT DOCUMENTS

| JP | 2001-297862 | 10/2001 |
| JP | 2003-219659 | 7/2003 |

(Continued)

OTHER PUBLICATIONS

Bascope et al. "Isolated Flyback-Current-Fed Push-Pull Converter for Power Factor Correction." *IEEE*. 1996. pp. 1184-1190.

(Continued)

*Primary Examiner* — Nguyen Tran
(74) *Attorney, Agent, or Firm* — Merchant & Gould P.C.

(57) ABSTRACT

A method for controlling a converter including a resonant circuit, where the converter is controlled such that control switches are switched into a first state at the occurrence of an event that is related to a dependent variable of the converter and are switched into a second state at the occurrence of an event that is not related to a dependent variable of the converter. The method may be employed in a converter or an inductive power transfer transmitter.

19 Claims, 6 Drawing Sheets

(51) Int. Cl.
*H02M 7/48* (2007.01)
*H02J 17/00* (2006.01)

(58) Field of Classification Search
CPC .............. H02M 3/3372; H02M 3/3378; H02M 3/33507; H02M 7/525; H02M 7/53871; H02M 7/537; H02M 7/53835; H02M 7/5381; H02M 7/5155; Y02B 70/1433
USPC ...... 363/15, 16, 17, 21.02, 21.03, 22–26, 40, 363/41, 56.01–56.08, 95, 97, 98, 131, 363/132, 133, 134
See application file for complete search history.

(56) References Cited

U.S. PATENT DOCUMENTS

| | | | |
|---|---|---|---|
| 5,293,308 | A | 3/1994 | Boys et al. |
| 5,386,359 | A | 1/1995 | Nochi |
| 5,510,974 | A | 4/1996 | Gu et al. |
| 5,654,881 | A | 8/1997 | Albrecht et al. |
| 5,729,444 | A * | 3/1998 | Perol ............................ 363/25 |
| 5,751,560 | A | 5/1998 | Yokoyama |
| 6,021,052 | A | 2/2000 | Unger et al. |
| 6,141,225 | A | 10/2000 | Gak et al. |
| 6,191,957 | B1 | 2/2001 | Peterson |
| 6,587,356 | B2 | 7/2003 | Zhu et al. |
| 6,728,118 | B1 | 4/2004 | Chen et al. |
| 7,180,759 | B2 | 2/2007 | Liptak et al. |
| 7,548,436 | B1 | 6/2009 | Chen |
| 2008/0013344 | A1 | 1/2008 | Mori |
| 2008/0211478 | A1 | 9/2008 | Hussman et al. |
| 2010/0202176 | A1 | 8/2010 | Hallak |
| 2011/0006743 | A1 | 1/2011 | Fabbro |
| 2013/0234531 | A1 | 9/2013 | Budgett et al. |

FOREIGN PATENT DOCUMENTS

| | | |
|---|---|---|
| JP | 2006-529079 | 12/2006 |
| NZ | 573241 | 12/2009 |
| WO | WO 93/23908 | 11/1993 |
| WO | WO 98/50993 | 11/1998 |
| WO | WO 2004/042750 | 5/2004 |
| WO | WO 2004/105208 | 12/2004 |
| WO | WO 2004/105226 | 12/2004 |
| WO | WO 2007/031914 | 3/2007 |
| WO | WO 2007/100265 | 9/2007 |
| WO | WO 2009/012778 | 1/2009 |
| WO | WO 2009/037613 | 3/2009 |
| WO | WO 2009/061219 | 5/2009 |
| WO | WO 2010/000010 | 1/2010 |
| WO | WO 2010/030195 | 3/2010 |
| WO | WO 2010/115976 | 10/2010 |

OTHER PUBLICATIONS

Bell. "Introduction to Push-Pull and Cascaded Power Converter Topologies." *Power Point Presentation for National Semiconductor Phoenix Arizona Design Center.* 2003. (22 pages).

Ben-Yaakov et al. "A Self-Adjusting Sinusoidal Power Source Suitable for Driving Capacitive Loads." *IEEE.* 2004. (4 pages).

Ben-Yaakov et al. "Modeling and Behavioral SPICE Simulation of a Self Adjusting Current-Fed Push-Pull Parallel Resonant Inverter (SA-CFPPRI)" *IEEE.* 2004. pp. 61-67.

Chen et al. "A Novel Single Stage Push Pull Converter with Integrated Magnetics and Ripple-free Input Current."

Madawala et al. "Mathematical model for split-capacitor push-pull parallel resonant converter in Buck mode." *IET Power Electron.* vol. 1. No. 3. 2008. pp. 356-367.

Madawala et al. "Operation of a Split-Capacitor Push-Pull Parallel Resonant Converter in Buck Mode." *IEEE.* 2007. pp. 1586-1591.

Peretz et al. "The self-adjusting current-fed push-pull parallel resonant inverter as a high frequency AC bus driver." *HAIT J. of Sci & Engineering.* vol. 2. I. 3-4. 2005. pp. 352-364.

Peretz et al. "The Self-Adjusting Current-Fed Push-Pull Parallel Resonant Inverter as high frequency AC bus driver." *IEEE.* 2004. pp. 52-55.

Thrimawithana et al. "A novel buck-boost control technique for push-pull parallel-resonant converters." *IEEE.* 2006. pp. 2805-2810.

Thrimawithana et al. "Analysis of Split-Capacitor Push-Pull Parallel Resonant Converter in Normal Mode." *SPEEDAM IEEE.* 2008. pp. 778-783.

Thrimawithana et al. "Analysis of Split-Capacitor Push-Pull Parallel Resonant Converter in Boost Mode." *IEEE.* vol. 23. No. 1. 2008. pp. 359-368.

International Search Report and Written Opinion for International Application No. PCT/NZ2012/000209 mailed May 12, 2014 (17 pages).

Notice of Refusal for JP Application No. 2014-540995 mailed Nov. 24, 2016 (English Translation and JP Machine Translation provided) 16 pages.

* cited by examiner

METHOD FOR CONTROLLING A CONVERTER

This application is a National Stage Application of PCT/NZ2012/000209, filed 9 Nov. 2012, which claims benefit of Ser. No. 596350, filed 10 Nov. 2011 in New Zealand, and Ser. No. 61/637,865, filed 25 Apr. 2012 in the United States and which applications are incorporated herein by reference. To the extent appropriate, a claim of priority is made to each of the above disclosed applications.

FIELD OF THE INVENTION

This invention relates generally to a method for controlling converters. More particularly, but not exclusively, the invention relates to a converter of a novel configuration suitable for use in an inductive power transfer system.

BACKGROUND OF THE INVENTION

Electrical converters are well known in the art and are available in many configurations for a variety of applications. Generally speaking, a converter converts an electrical supply of one type to an output of a different type. Such conversion can include DC-DC, AC-AC and DC-AC electrical conversions. In some configurations a converter may have any number of DC and AC 'parts', for example a DC-DC converter might incorporate an AC-AC transformer converter section.

More specifically, 'inverter' is a term that can be used to describe a DC-AC converter. An inverter may exist in isolation or as part of a larger converter (as in the above example, which must invert the DC to AC prior to the AC-AC transformer). Therefore, 'converter' should be interpreted to encompass inverters themselves and converters that include inverters. For the sake of clarity, the remainder of this specification will refer only to 'converter' without excluding the possibility that 'inverter' might be a suitable alternative term in certain contexts.

There are many configurations of converters that achieve DC-AC conversion. Predominately, this is through a suitable arrangement of switches that by means of co-ordinated switching cause current to flow in alternating directions through a component. The switches can be controlled by control circuitry to achieve a desired AC output waveform. Further circuit components can be included to shape the output waveform. Subject to the particular circuit topology, the output waveform will be dependent on the switches' frequencies, duty-cycles and working interrelationship.

One example of the use of converters is in the context of inductive power transfer (IPT) systems. These systems are a well known area of established technology (for example, wireless charging of electric toothbrushes) and developing technology (for example, wireless charging of handheld devices on a 'charging mat'). Typically, a primary side generates a time-varying magnetic field from a transmitting coil or coils. This magnetic field induces an alternating current in a suitable receiving coil that can then be used to charge a battery, or power a device or other load. In some instances, it is possible to add capacitors around the transmitter coil to create a resonant circuit. Similarly, capacitors can be added around the receiver coil(s) to create a resonant circuit. Using a resonant circuit can increase power throughput and efficiency at the corresponding resonant frequency.

Ordinarily, the transmitting coils are driven by a converter. The characteristics of the driving current (such as frequency, phase and magnitude) will be related to the particular IPT system. In some instances, it may be desirable for the driving frequency of the converter to match the resonant frequency of the resonant transmitting coil and/or the resonant receiving coil. The magnitude may be changed to correspond to the load requirements on the secondary side. In some systems, the load requirements can be communicated to the primary side by a suitable means.

All of these layers of control add complexity and cost to the design of IPT systems. Accordingly, it is desired to have a simplified method of controlling a converter.

Another problem associated with IPT systems, as outlined in U.S. 2008/0211478 A1 (Hussman et al), is that for resonant systems, the resonant frequency of the transmitter is not fixed but varies according to the load on the receiver. Changes in the load are reflected back to the transmitter through the mutual inductive coupling, which in turns affects the resonant frequency of the transmitter. Thus, if the converter is supplying an output to the transmitter coil at a frequency that is no longer equivalent to the resonant frequency of the transmitter the power throughput is diminished and the system becomes less efficient.

A further problem associated with IPT systems is that the values of resonant components such as the transmitter or receiver coil and the resonant capacitors may vary due to manufacturing tolerances, age, temperature, power transmission distance changes and the presence of nearby metal or magnetic material, among other factors. These variations affect the resonant frequency of the transmitter, which may fall out of resonance with the receiver causing power throughput to be diminished and the system to become less efficient.

One way that this variation in resonant frequency can be accommodated is by adapting the control switches to switch off and switch on when the voltage through the transmitting coil goes to zero. Thus, the switching frequency will automatically correspond to the resonant frequency of the transmitting coil. A disadvantage of such a solution is that the frequency of the transmitted magnetic field will then vary over a range dependent on the resonant frequency of the transmitting coil. This is problematic for two reasons: first, the receiver must adaptively retune to changes in the transmitted frequency or alternatively lose power; and secondly, it is undesirable to have the system operating over a range of frequencies since the available bandwidth might be too narrow.

It is an object of the invention to provide a method for controlling a converter which allows for more simplified control of the electrical characteristics of the output of the converter such that it can still respond to changes in resonant frequency, or to at least provide the public with a useful choice.

SUMMARY OF THE INVENTION

According to one exemplary embodiment there is provided a method of controlling a converter, including a resonant circuit having an inductor in which the direction of current through the inductor is dependent on the state of associated control switches, wherein each control switch is: switched into a first state at the occurrence of a first switching event, which is related to a dependent variable of the converter; and switched into a second state at the occurrence of a second switching event, which is not related to dependent variables of the converter.

According to another exemplary embodiment there is provided a converter including a resonant circuit having an inductor in which the direction of current through the inductor is dependent on the state of associated control switches, wherein the converter includes control circuitry adapted to control the control switches so that: the control switches are switched into a first state at the occurrence of a first switching event which is related to a dependent variable of the converter; and the control switches are switched into a second state at the occurrence of a second switching event, which is not related to dependent variables of the converter.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components which the use directly references, and possibly also of other non-specified components or elements.

Reference to any prior art in this specification does not constitute an admission that such prior art forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

DETAILED DESCRIPTION OF EMBODIMENTS OF THE INVENTION

Figure 1:
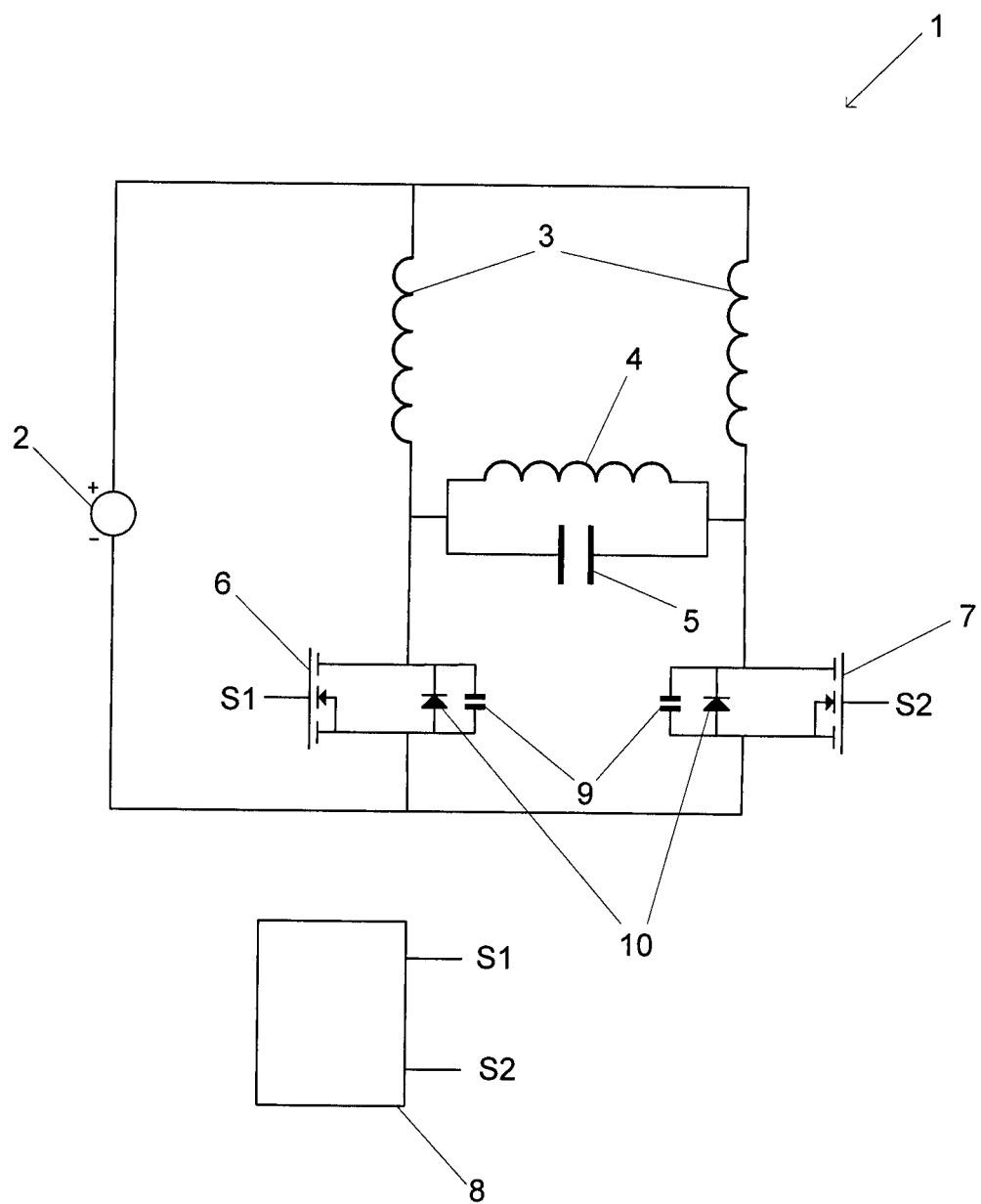
FIG. 1 shows a converter topology according to the present invention.

Referring to FIG. 1, there is shown an embodiment of a converter 1 according to the present invention. The converter includes a DC supply 2, DC inductors 3, an output inductor 4, resonant capacitor 5, control switches (which for the sake of clarity shall be called switch one 6 and switch two 7) and control circuitry 8. Also shown in FIG. 1 are parasitic capacitors 9 and parasitic body diodes 10, which are characteristic of the control switches. Those skilled in the art will appreciate that this is one embodiment of a basic converter topology, and that there are any number of variations that would be apparent to one skilled in the field. Suffice to say, that the present invention is not limited to this specific topology, and those skilled in the art will appreciate how the invention can be made to apply to other converter topologies. Similarly, those skilled in the art will appreciate that some converter topologies may need to be adapted to work with the present invention.

Figure 2:
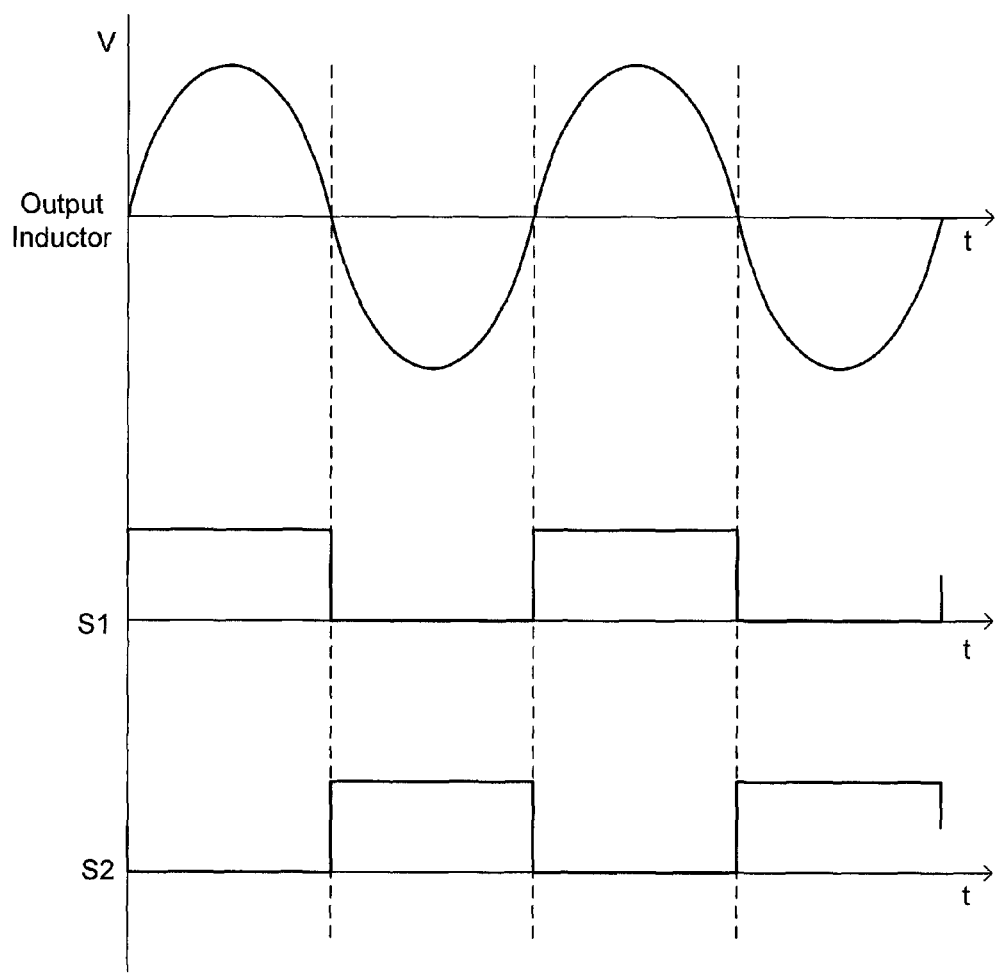
FIG. 2 shows waveforms relating to typical control of a converter.

Under typical operation of the converter in FIG. 1 the switch one 6 and switch two 7 are alternately switched on and off with a 50% duty cycle. The frequency of the switches is such as to match the natural resonant frequency of the output inductor 4 and resonant capacitor 5. This will produce the waveforms as shown in FIG. 2. These waveforms and the explanation as to their formation are well known in the art, and therefore there is no need to explain them here. To achieve the switching pattern, prior systems might employ a controller that is programmed to activate the switches alternately according to the zero crossings of the output inductor voltage.

According to the present invention, the method of controlling the converter is as follows: each switch is switched into a first state at the occurrence of a first switching event which is related to a dependent variable of the converter; and switched into a second state at the occurrence of a second switching event, which is not related to dependent variables of the converter.

The remainder of the discussion of the invention will be based on a preferred embodiment of the invention wherein the first state is an on state, and the second state is an off state. However, those skilled in the art will appreciate that in some instances the topology may allow the reversal of this i.e. the first state being an off state and the second state being an on state and the invention is intended to encompass this possibility.

First Switching Event

In one embodiment of the invention, the first switching event is when the voltage across switch one 6 or switch two 7 goes to, or near to, zero. That is to say, the switch one switches on when the voltage across switch one goes to, or near to, zero and switch two switches on when the voltage across the switch two goes to, or near to, zero. Since the voltage across switch one 6 or switch two 7 is dependent on the voltage across the output inductor 4, it can be said to be related to a dependent variable of the converter. In this way, the switches switching on can accommodate changes in the system since the occurrence of the first switching event may alter with changes in the system.

It is well known in the art how the voltage can be detected and how to use it reaching a certain value as a triggering event. For example, it is possible to use a comparator circuit to trigger a change in state when a voltage across the resonant transmitter coil falls below a defined threshold. However, the present invention is not limited to any particular method. In the present invention, this control can be contained in the control circuitry 8.

Referring to the converter topology in FIG. 1, one benefit of using the voltage across switch one 6 or switch two 7 reaching or nearing zero as the first switching event is that it ensures zero-voltage switching. That is to say, the switches are switched on when the voltage across them is zero, which minimises energy losses, improves efficiency and prevents damage to the switches due to overcurrent.

In another embodiment of the invention, the first switching event is the zero crossing of the current through switch one or switch two. That is to say, switch one switches on when the current through switch one goes to, or near to, zero and switch two switches on when the current through switch two goes to, or near to, zero. Those skilled in the art will appreciate that there are other characteristics in a circuit that can vary, and that some of these may be suitable as the basis for a first switching event.

Second Switching Event

In one embodiment of the invention, there are two switches, and the second switching event is the expiration of a fixed time interval ($\alpha$) after the other switch has switched off. That is to say, switch one 6 is switched off a fixed time interval ($\alpha$) after switch two has switched off and switch two 7 is switched off a fixed time interval ($\alpha$) after switch one has switched off. Since the switching off of switch one or switch two is not related to a dependent variable of the system (i.e. it is preset and will not vary), it will stay the same regardless of any changes in the system. Further, since the switches are continuously switching off after a fixed time interval, the frequency of the switches is also not related to a dependent variable of the system. The frequency of the converter can be calculated with the following formula:

$$f_{converter} = \frac{1}{2\alpha}$$

It is well known in the art how to detect a switch switching into an off state, and how to trigger another switch to switch off after a fixed delay. Those skilled in the art will appreciate how such methods could be applied to the present invention. Alternatively, a controller could be programmed to internally control this process without there being any need to actually detect the change in state of the switches. In an embodiment of the present invention, this control can be contained in the control circuitry 8, and the time interval, $\alpha$, can be varied by a user or some other means.

In the above embodiment, the second switching event is the expiration of a time interval that runs from a change of the state of the other switch. However, this is not the only possible independent event that could be used as a second switching event. For example, the second switching event may be the expiration of a time interval that runs from a change of state of the same switch, or a clock signal could be used to trigger the switches to switch off, irrespective of the state of the other switch.

Figure 3:
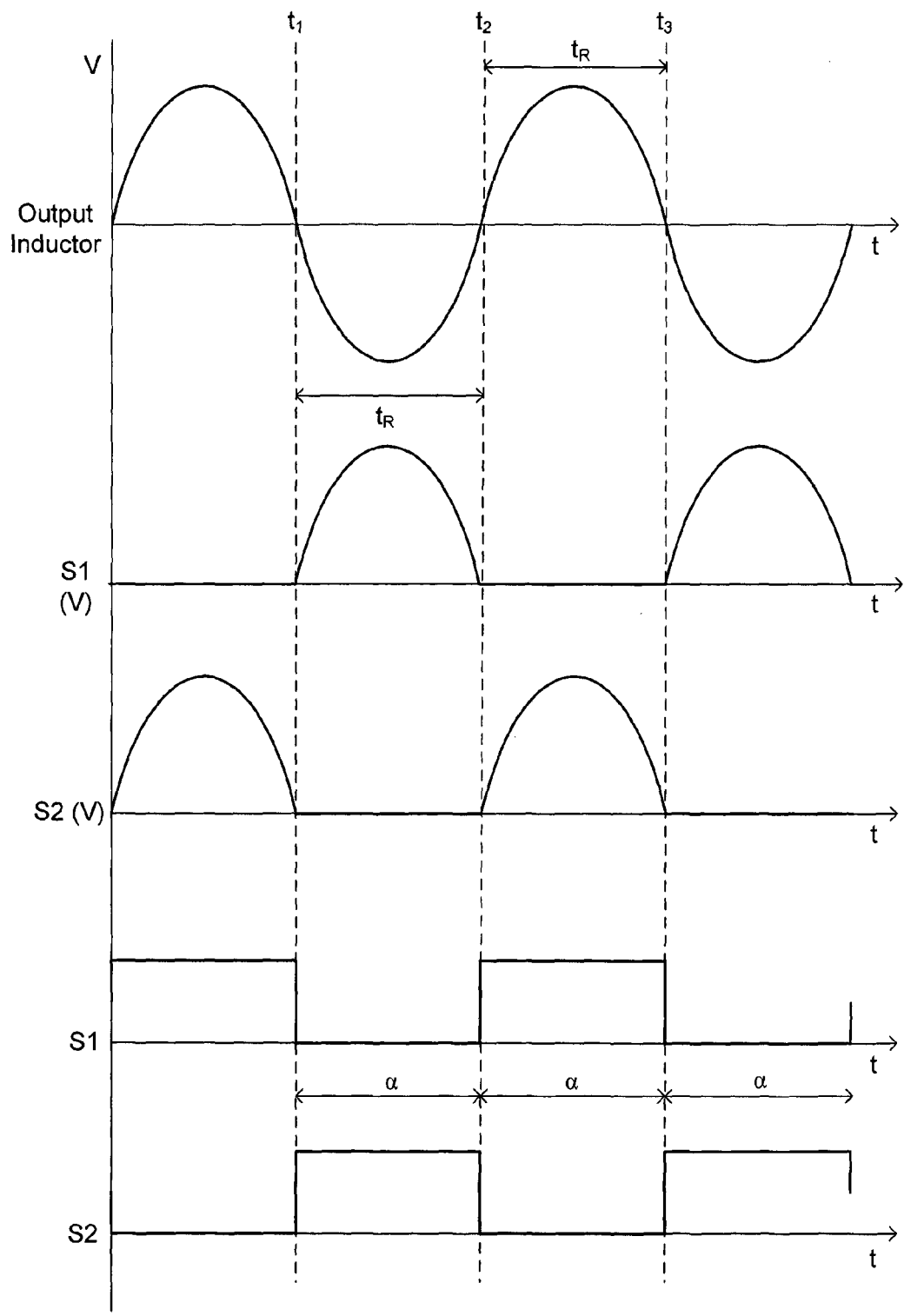
FIG. 3 shows waveforms relating to control of a converter according to the present invention.

The above embodiment can be further explained having regard again to FIG. 1 and FIG. 3. FIG. 3 shows the state of switch one and switch two, the voltage across each switch and the voltage across the output inductor. At time $t_1$, switch one switches off and switch two switches on. Switch two switches on because the voltage across the switch goes to zero. As switch one is switched off, the voltage across the inductor begins to increase then decrease (resulting in the observed waveform). After time $\alpha$ has elapsed since switch one switched off, at time $t_2$, switch two switches off. Since $\alpha$ has been preset to equate to half the natural resonant period ($t_R$) of the output inductor and output capacitor, $t_2$ corresponds to the time when the voltage across switch one goes to zero, and thus switch one switches on. This cycle repeats and results in a switching pattern that has the same effect as the 50% duty cycle with fixed frequency described earlier.

Figure 4:
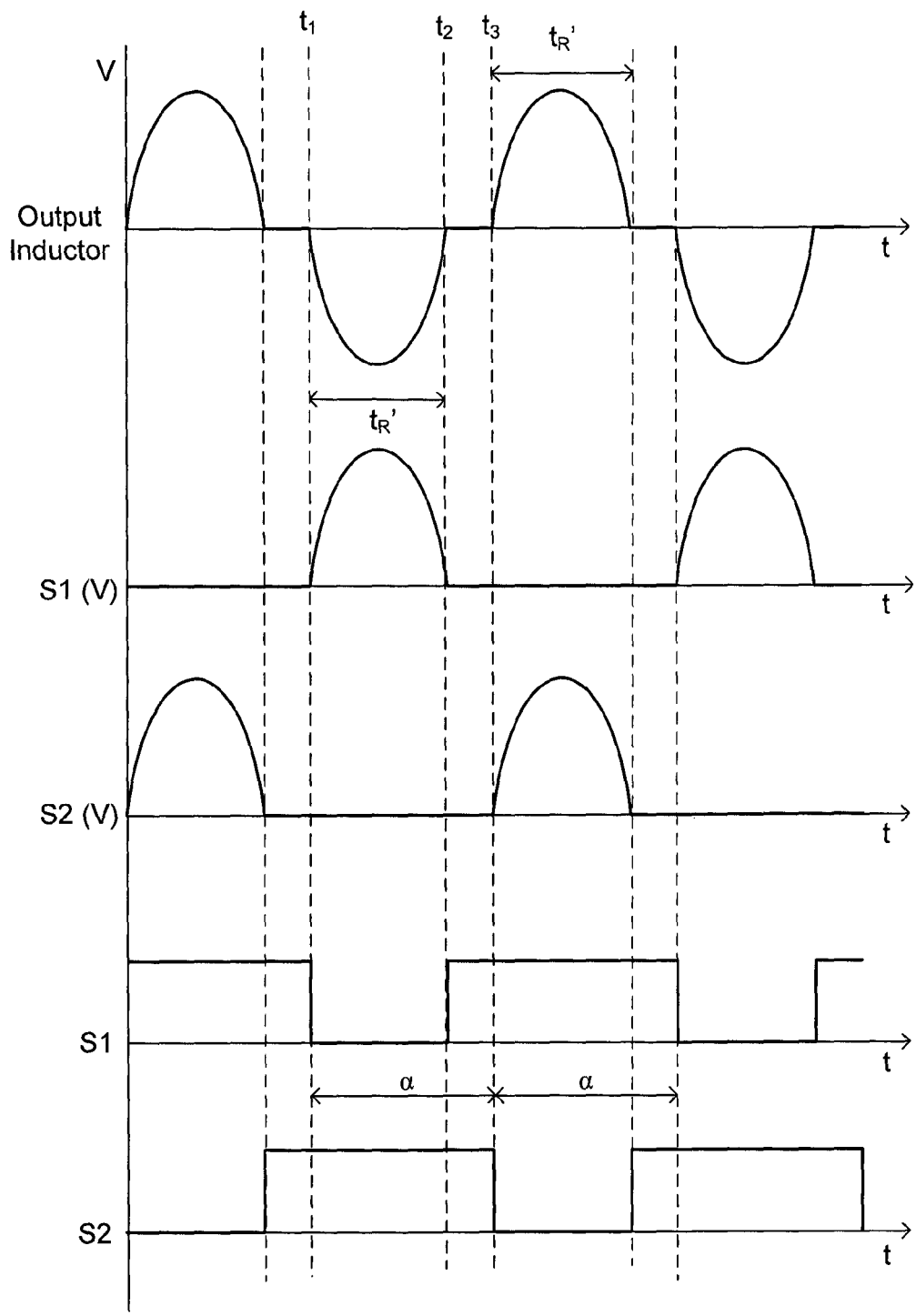
FIG. 4 shows waveforms relating to control of a converter according to the present invention.

The uniqueness of this method becomes more marked when the resonant frequency of the output inductor and output capacitor changes (whether by: degradation of circuit parts; due to load changes affecting the coupling between the primary and secondary coils in IPT systems; or some other reason). Referring to FIG. 4, there is shown waveforms of an embodiment of the invention when the system is in a state where half the resonant time period ($t_R'$) is less than $\alpha$. (Equally, where $\alpha$ is fixed to a value more than $t_R'$.) At time $t_1$, switch one switches off, causing the voltage across the inductor to increase then decrease resulting in the observed waveform. Since $t_R'$ is less than $\alpha$, the voltage across switch one reaches zero before $\alpha$ has elapsed. Hence, at $t_2$ switch one switches on. This occurs before switch two has switched off, so that both switches are simultaneously on. Then at $t_3$, after time $\alpha$ has elapsed since switch one switched off, switch two switches off. This cycle repeats and results in a switching pattern with a duty cycle greater than 50%, but with the same frequency as the example shown in FIG. 3 (i.e. $1/(2\alpha)$).

Figure 5:
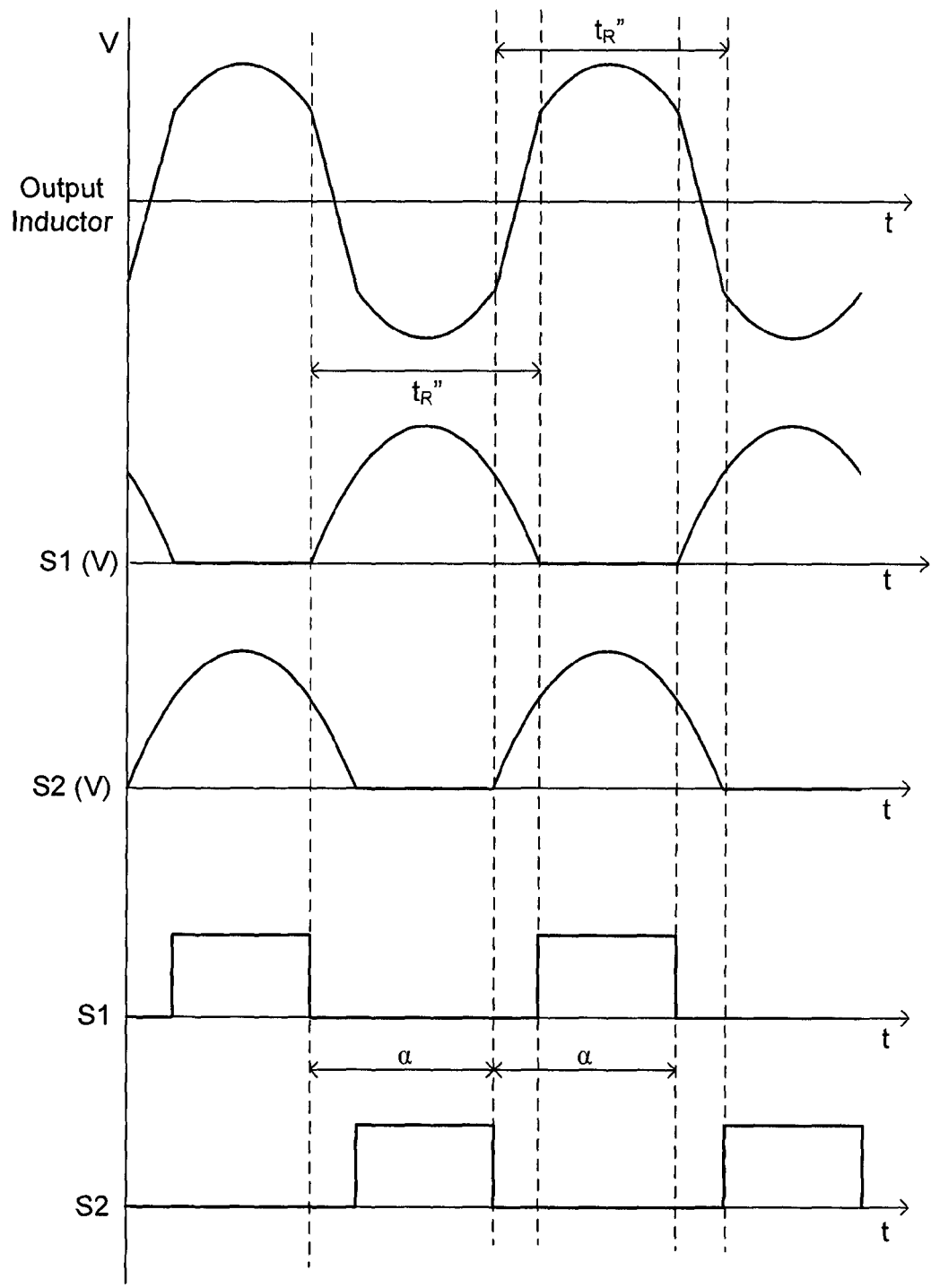
FIG. 5 shows waveforms relating to control of a converter according to the present invention.

Similarly, FIG. 5 demonstrates waveforms for an embodiment of the invention where $t_R''$ is more than $\alpha$ (or equivalently, where $\alpha$ is set to less than $t_R''$). In this embodiment, rather than both switches being simultaneously on for a portion of each cycle (as with the example given in FIG. 4), both switches are simultaneously off. Those skilled in the art would understand that the circuit topology outlined in FIG. 1 would not work under these conditions as the parasitic capacitances 9 would not be large enough to avoid a high voltage spike from developing across open switch one 6 or open switch two 7 due to the energy stored in the inductors 3. This phenomenon is described in U.S. Pat. No. 4,980,813, which proposes alleviating this problem by providing a large snubber network. Those skilled in the art would appreciate that it would be possible to include additional discrete capacitors across each of switch one 6 and switch two 7 as snubbers, as well as forming part of the resonating network together with the output inductor 4.

Figure 6:
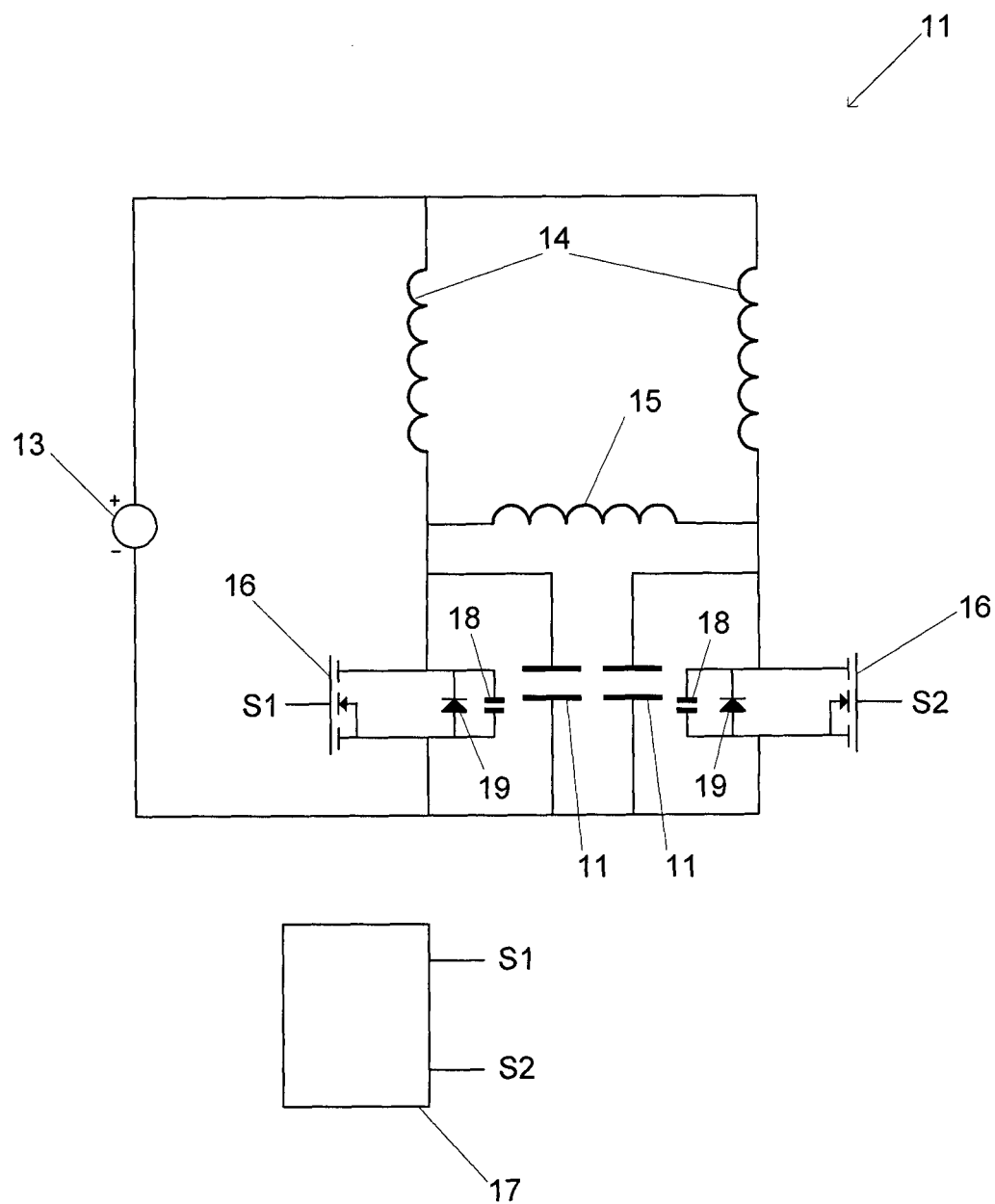
FIG. 6 shows another converter topology according to the present invention.

FIG. 6 shows such an alternative converter topology 11, which includes such additional capacitors 12. The converter 11 includes a DC supply 13, DC inductors 14, an output inductor 15, control switches 16 with parasitic capacitors 18 and parasitic body diodes 19, and control circuitry 17. This also demonstrates that the invention cannot be universally applied to all topologies and is not specific to a particular converter topology, but that those skilled in the art will appreciate how the invention can be made to work for converter topologies.

In an alternative embodiment of the invention, it may be desirable to prevent the waveforms as shown in FIG. 5 from occurring (for example, because a topology the same or similar to that shown in FIG. 1 has been employed). This can be achieved by causing the switching method to default to a suitable prior art method of controlling a converter under certain circumstances.

For example, it is possible to adjust the control method so that the switches are switched off when the last of the following occurs:
  the expiration of a fixed time interval ($\alpha$) after the other switch has switched off (i.e. the second switching event as described above); or
  The other switch switching on.

Thus, the waveforms shown in FIG. 5 would not eventuate as the switches would switch off only when the other switches switches on, preventing both switches being simultaneously off. This embodiment would then operate at a fixed frequency whenever the resonant period is less than or equal to $2\alpha$ (i.e. $1/(2\alpha)$) but would have a variable frequency whenever the resonant period is greater than $2\alpha$.

Overall, it will be apparent to those skilled in the art that invention results in a method for controlling a converter that allows the frequency to remain fixed (as determined by $\alpha$), whilst still being responsive to parameter variations such as changes in inductance and capacitance values, and changes in the load or coupling (by the duty cycle of the switches changing).

Referring to the problems outlined with IPT systems described in U.S. 2008/0211478 A1 (Hussman et al), it can be seen how the present method of controlling an inverter resolves the problem in the context of transmitters. The IPT system is designed such that an increase in load on the output of the receiver will cause the resonant frequency of the transmitting inductor (i.e. coil or coils) and capacitor to increase. However, the present invention ensures that the operating frequency of the transmitter remains constant (as determined by α). This can be demonstrated by comparing FIGS. 3 and 4.

If, for example, α is set to $t_R$ under a first load, the waveform in FIG. 3 results. However, if there is an increase in load on the output of the receiver, the resonant frequency of the transmitting coil and capacitor will increase, which is equivalent to half the resonant period decreasing (i.e. $t_R'$, where $t_R'<t_R$). Since $t_R'$ is less than α, the waveforms in FIG. 4 result. As will be readily apparent, the frequency of the transmitter remains constant despite load changes affecting the resonant frequency of the transmitting coil and capacitor. The present invention is able to adapt essentially immediately to changes in the load without requiring complicated control circuitry.

A further benefit in the context of IPT systems is that receivers do not need to retune because the transmitter frequency is constant. The receivers can be tuned to a set frequency, which results in more efficient wireless energy transfer.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A method of controlling a converter, including a resonant circuit having an inductor in which a direction of a current through the inductor is dependent on a state of at least a first control switch and a second control switch, the method comprising:
   a. switching the first control switch into a first state upon occurrence of a first zero crossing event, wherein the first zero crossing event occurs when a voltage across the first control switch reaches zero;
   b. switching the first control switch into a second state in response to expiration of a first predetermined time interval, wherein the first predetermined time interval is triggered to begin upon the second control switch switching to the second state;
   c. switching the second control switch into the first state upon occurrence of a second zero crossing event, wherein the second zero crossing event occurs when a voltage across the second control switch reaches zero; and
   d. switching the second control switch into the second state in response to expiration of a second predetermined time interval, wherein the second predetermined time interval is triggered to begin upon the first control switch switching to the second state.

2. The method as claimed in claim 1, wherein the first state is an on state and the second state is an off state.

3. The method as claimed in claim 1, wherein the first state is an off state and the second state is an on state.

4. The method as claimed in claim 1, wherein the predetermined time interval is the same as half the desired period of operation of the converter.

5. The method as claimed in claim 1, wherein the predetermined time interval is the same as one cycle of operation of the converter.

6. The method as claimed in claim 1, wherein the desired period of operation of the converter is chosen to be similar to the unloaded natural resonant period of the converter.

7. A converter including a resonant circuit having an inductor in which a direction of a current through the inductor is dependent on a state of at least a first control switch and a second control switch, wherein the converter includes control circuitry adapted to control the control switches so that:
   a. the first control switch is switched into a first state upon occurrence of a first zero crossing event, wherein the first zero crossing event occurs when a voltage across the first control switch reaches zero;
   b. the first control switch is switched into a second state in response to expiration of a first predetermined time interval, wherein the first predetermined time interval is triggered to begin upon the second control switch switching to the second state;
   c. the second control switch is switched into the first state upon occurrence of a second zero crossing event, wherein the second zero crossing event occurs when a voltage across the second switch reaches zero; and
   d. the second control switch is switched into the second state in response to expiration of a second predetermined time interval, wherein the second predetermined time interval is triggered to begin upon one of the first control switch and the second control switch switching to the second state.

8. The converter of claim 7, wherein the first state is an on state and the second state is an off state.

9. The converter of claim 7, wherein the first state is an off state and the second state is an on state.

10. The converter of claim 7, wherein the control circuitry is adapted to detect the first zero crossing event and the second zero crossing event.

11. The converter of claim 8, wherein the second switching event is the end of a predetermined time interval after a control switch being switched off.

12. An inductive power transfer transmitter including a converter as claimed claim 7.

13. The converter of claim 1, wherein the occurrence of the second switching event is related to a substantially constant converter frequency.

14. The converter of claim 7, wherein the occurrence of the second switching event is related to a substantially constant converter frequency.

15. The method of claim 1, wherein the second switch is switched to the first state while the first switch is in the first state.

16. The method of claim 1, wherein the second switch is switched to the first state while the first switch is in the second state.

17. The method of claim 1, wherein the first predetermined time interval and the second predetermined time interval are of equal duration.

18. A method of controlling a converter, including a resonant circuit having an inductor in which a direction of a current through the inductor is dependent on a state of at least a first control switch and a second control switch, the method comprising:
   a. switching the first control switch into a first state upon occurrence of a first zero crossing event, wherein the first zero crossing event occurs when a voltage across the first control switch reaches zero;
   b. switching the first control switch into a second state in response to expiration of a first predetermined time interval, wherein the first predetermined time interval is triggered to begin upon the second control switch switching to the second state;

c. switching the second control switch into the first state upon occurrence of a second zero crossing event, wherein the second zero crossing event occurs when a voltage across the second control switch reaches zero; and d. switching the second control switch into the second state in response to expiration of a second predetermined time interval, wherein the second predetermined time interval is triggered to begin upon the first control switch switching to the second state.

19. The method of claim 12, wherein the first predetermined time interval and the second predetermined time interval are of equal duration.

* * * * *